US009472845B2

(12) United States Patent
Teillet

(10) Patent No.: US 9,472,845 B2
(45) Date of Patent: Oct. 18, 2016

(54) MULTIBAND 40 DEGREE SPLIT BEAM ANTENNA FOR WIRELESS NETWORK

(71) Applicant: Intel Corporation, Santa Clara, CA (US)

(72) Inventor: Anthony Teillet, Trabuco Canyon, CA (US)

(73) Assignee: Intel Corporation, Santa Clara, CA (US)

( * ) Notice: Subject to any disclaimer, the term of this patent is extended or adjusted under 35 U.S.C. 154(b) by 888 days.

(21) Appl. No.: 13/715,449

(22) Filed: Dec. 14, 2012

(65) Prior Publication Data

US 2013/0285852 A1 Oct. 31, 2013

Related U.S. Application Data

(60) Provisional application No. 61/576,307, filed on Dec. 15, 2011.

(51) Int. Cl.

| | |
|---|---|
| ***G01S 3/16*** | (2006.01) |
| ***H01Q 3/38*** | (2006.01) |
| ***H01Q 1/24*** | (2006.01) |
| ***H01Q 3/40*** | (2006.01) |
| ***H01Q 21/06*** | (2006.01) |
| ***H01Q 25/00*** | (2006.01) |

(52) U.S. Cl.

CPC ................ *H01Q 3/38* (2013.01); *H01Q 1/246* (2013.01); *H01Q 3/40* (2013.01); *H01Q 21/061* (2013.01); *H01Q 25/00* (2013.01)

(58) Field of Classification Search

CPC .......... H01Q 3/38; H01Q 1/246; H01Q 3/40; H01Q 21/061; H01Q 25/00

USPC .......................................................... 342/378

See application file for complete search history.

(56) References Cited

U.S. PATENT DOCUMENTS

| | | | | |
|---|---|---|---|---|
| 5,621,752 A * | 4/1997 | Antonio | H04B 1/7085 370/335 |
| 2002/0080073 A1* | 6/2002 | Wastberg | H01Q 1/246 343/700 MS |
| 2013/0181880 A1* | 7/2013 | Shen | H01Q 1/523 343/853 |

OTHER PUBLICATIONS

Krytar Technical Note 2, "Krytar 3 dB 90 Degree Hybrids Covers 0.5 to 40GHz", Jul. 2009.*

* cited by examiner

*Primary Examiner* — Frank J McGue

(74) *Attorney, Agent, or Firm* — Schwegman Lundberg & Woessner, P.A.

(57) ABSTRACT

A compact multiband 40 degree split beam antenna system for a wireless network is disclosed. Each band employs a 3 column array with a special 3 output feed network. The 3 output feed network employs either a broadband 90 degree hybrid coupler with a 180 degrees splitter, or 2 broadband 90 degree hybrid couplers. The arrays employ dipole antenna elements, patch antenna elements, or a combination of both types. The antenna may exhibit 35 to 40 degrees horizontal beamwidth.

15 Claims, 7 Drawing Sheets

MULTIBAND 40 DEGREE SPLIT BEAM ANTENNA FOR WIRELESS NETWORK

RELATED APPLICATION INFORMATION

The present application claims priority under 35 U.S.C. Section 119(e) to U.S. Provisional Patent Application Ser. No. 61/576,307 filed Dec. 15, 2011, the disclosure of which is incorporated herein by reference in its entirety.

BACKGROUND OF THE INVENTION

1. Field of the Invention

The present invention relates in general to communication systems and components. More particularly, the present invention is directed to antennas for wireless networks.

2. Description of the Prior Art and Related Background Information

Due to the need for increased capacity in wireless networks, 6 sector solutions are becoming increasingly more popular today. A 6 sector solution for a cellular site roughly doubles the capacity over a 3 sector site. Narrow beam antennas, having beamwidths anywhere from 28 to 45 degrees, are used today for 6 sector applications. These antennas can be divided in 2 types, single beams pointing in the mechanical boresight, or a multibeam/splitbeam type pointing at different angles.

Current split beam technology today typically uses 4 column arrays with about 0.5 wavelength column spacing. The feed network typically uses a 4 way butler matrix. The 2 beams have about 28 to 30 degrees horizontal beamwidth. While these antennas can be popular at AWS, PCS, UMTS 2100 bands, they are not popular for 700 MHz LTE ("Long Term Evolution") and 790 MHz Digital Dividend ("DD"), because of their physical sizes. To cover the 968-894 MHz band, a 4 column array will make the antenna about 30 inches wide, so zoning approval can be an issue for many sites.

Accordingly, there is a need to provide an antenna having a limited total physical width.

SUMMARY OF THE INVENTION

In a first aspect, the present invention provides an antenna system. The system comprises a first set of one or more antenna elements, a second set of one or more antenna elements, and a third set of one or more antenna elements, the second set of antenna elements positioned adjacent to the first set of antenna elements, the third set of antenna elements positioned adjacent to the second set of antenna elements. The antenna system further comprises a beam forming feed network comprising a first input receiving a right beam RF signal, a second input receiving a left beam RF signal, a broadband 90 degree hybrid coupler having a first, a second, a third, and a fourth port, the first port coupled to the first input and receiving the right beam RF signal, the second port coupled to the second input and receiving the left beam RF signal, the fourth port connected to the second set of antenna elements. The antenna system further comprises a two-way splitter connected to the hybrid coupler third port, the splitter having a first and a second splitter port, the second splitter port connected to the third set of antenna elements, and the first splitter port providing a 180 degree delayed signal to the first set of antenna elements.

In an embodiment, the first, second, and third sets of antenna elements generate a dual beam RF radiated emission pattern having a left beam and a right beam and the antenna system also provides a dual frequency band signal.

In another aspect, the present invention provides an antenna system comprising a first set of one or more antenna elements, a second set of one or more antenna elements, and a third set of one or more antenna elements, the second set of antenna elements positioned adjacent to the first set of antenna elements, the third set of antenna elements positioned adjacent to the second set of antenna elements. The antenna system further comprises a beam forming feed network comprising a first input receiving a right beam RF signal, a first two-way splitter connected to the first input and splitting the right beam RF signal between a first and second splitter port, a second input receiving a left beam RF signal, and a second two-way splitter connected to the second input and splitting the left beam RF signal between a third and fourth splitter port. The beam forming feed network further comprises a first broadband 90 degree hybrid coupler having a first, a second, a third, and a fourth port, the fourth port connected to the first two-way splitter first splitter port, the third port receiving a 90 degree delayed left beam RF signal, the first port connected to the first set of antenna elements. The beam forming network further comprises a second broadband 90 degree hybrid coupler having a fifth, a sixth, a seventh, and an eighth port, the sixth port connect to the third set of antenna elements, the seventh port connected to the fourth splitter port of the second two-way splitter, the eighth port receiving a 90 degree delayed right beam RF signal, and a two-way combiner connected to and combining the second port of the first hybrid coupler and the fifth port of the second hybrid coupler and providing an output RF signal to the second set of antenna elements.

In a preferred embodiment, the first, second, and third sets of antenna elements may generate a dual beam RF radiated emission pattern having a left beam and a right beam. Relative phases of the emission of the first, second, and third sets of antenna elements may be 0 degrees, + or −90 degrees, and + or −180 degrees, respectively, for the left and right beam signals. The antenna system may also provide a dual frequency band signal.

In another aspect, the present invention provides an antenna system. The system comprises a first, second, and third set of antenna elements being arranged as a first, second, and third column and aligned along a first, second, and third symmetry axis, respectively, the first, second, and third axes being parallel with each other, wherein the first and third set of antenna elements are also aligned with respect to axes orthogonal to the first and third symmetry axes, and wherein the second set of antenna elements are offset with respect to the axes orthogonal to the first and third symmetry axes, the first, second, and third antenna elements being operative in a first frequency band. The system further comprises a fourth, fifth, and sixth set of antenna elements being arranged as a fourth, fifth, and sixth column and aligned along a fourth, fifth, and sixth symmetry axes, respectively, the fourth, fifth, and sixth axes being parallel with each other and the first, second, and third symmetry lines, the fifth symmetry axis being co-located with the second symmetry axis and the fourth and sixth symmetry axes located between the first and third symmetry axes, wherein the fourth and sixth set of antenna elements are also aligned with respect to axes orthogonal to the fourth and sixth symmetry axes, and the fifth set of antenna elements are offset with respect to the axes orthogonal to the fourth and sixth symmetry axes, the fourth, fifth, and sixth antenna elements being operative in a second frequency band.

In a preferred embodiment, the antenna system further comprises a dual beam forming network coupled to each of the respective antenna elements. The frequency of the first frequency band may be less than the frequency of the second frequency band. The first, second, and third set of antenna elements preferably comprise dipole antenna elements, each having elements oriented at approximately a 45 degree angle with respect to the first, second, and third symmetry axes, and the fourth, fifth, and sixth set of antenna elements preferably comprise patch antennas, each having sides oriented at approximately a 45 degree angle with respect to the fourth, fifth, and sixth symmetry axes. The first and third set of antenna elements preferably comprise a first set of patch antennas, each having sides oriented at approximately a 45 degree angle with respect to the first and third symmetry axes, the second set of antenna elements preferably comprise dipole antennas, and the fourth, fifth, and sixth set of antenna elements preferably comprise a second set of patch antennas, each having sides oriented at approximately a 45 degree angle with respect to the fourth, fifth, and sixth symmetry axes.

The first and third set of antenna elements preferably comprise a first set of patch antennas, each having sides oriented parallel with respect to the first and third symmetry axes, the second set of antenna elements preferably comprise dipole antenna elements, each having elements oriented at approximately a 45 degree angle with respect to the second symmetry axis, the fourth and sixth set of antenna elements preferably comprise a second set of patch antennas, each having sides oriented at approximately a 45 degree angle with respect to the fourth and sixth symmetry axes, and the fifth set of antenna elements preferably comprise a third set of patch antennas, each having sides oriented parallel with respect to the fifth symmetry axis. The separation between adjacent symmetry axes of the fourth, fifth, and sixth symmetry axes may be the product of the wavelength of second frequency band and a value in the range of 0.4 and 0.55. The separation of the antenna elements in the fourth, fifth, and sixth set of antenna elements may be uniformly spaced with respect to the fifth symmetry axis and the axis orthogonal to the fifth symmetry axis.

Further features and aspects of the invention are set out in the following detailed description.

DETAILED DESCRIPTION OF THE INVENTION

One or more embodiments provide a 6 sector wireless network site solution employing a 35 to 40 degree HBW ("Horizontal Beamwidth") antenna to increase capacity while limiting the total width of the antenna to a more acceptable level, for example, in the 21 inches to 24 inches range. This is achieved by creating a split beam antenna using only 3 columns. Theoretically, removing 1 column will save about 0.5λ, which is about 7.5 inches at 796 MHz. This solution allows for easier site acquisition with a more zoning friendly antenna without compromising on capacity and antenna performance.

Figure 1:
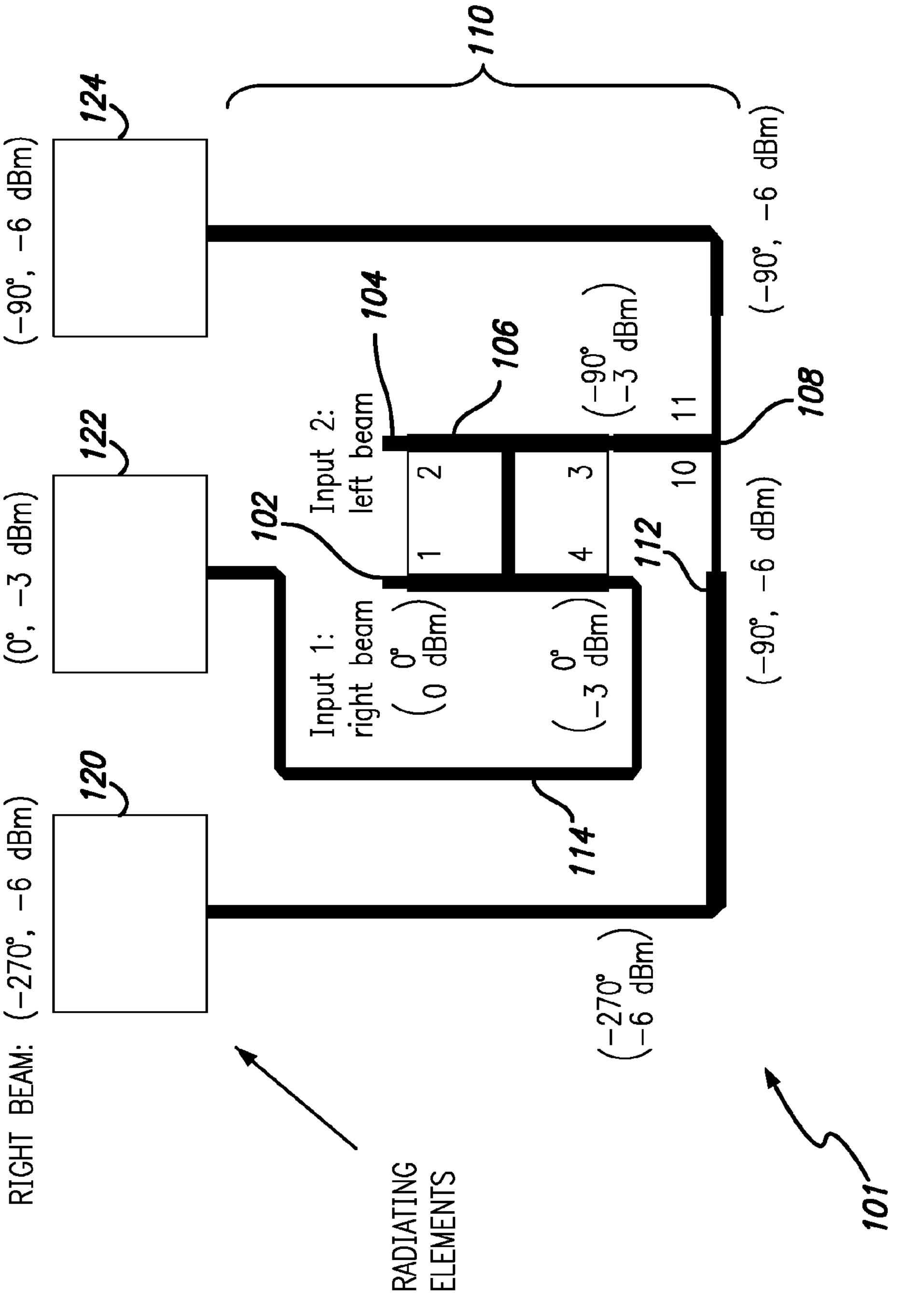
FIG. 1 is a schematic representation of a feed network employing a broadband 90 degree hybrid coupler with a 180 degree delay in an embodiment.
Figure 2:
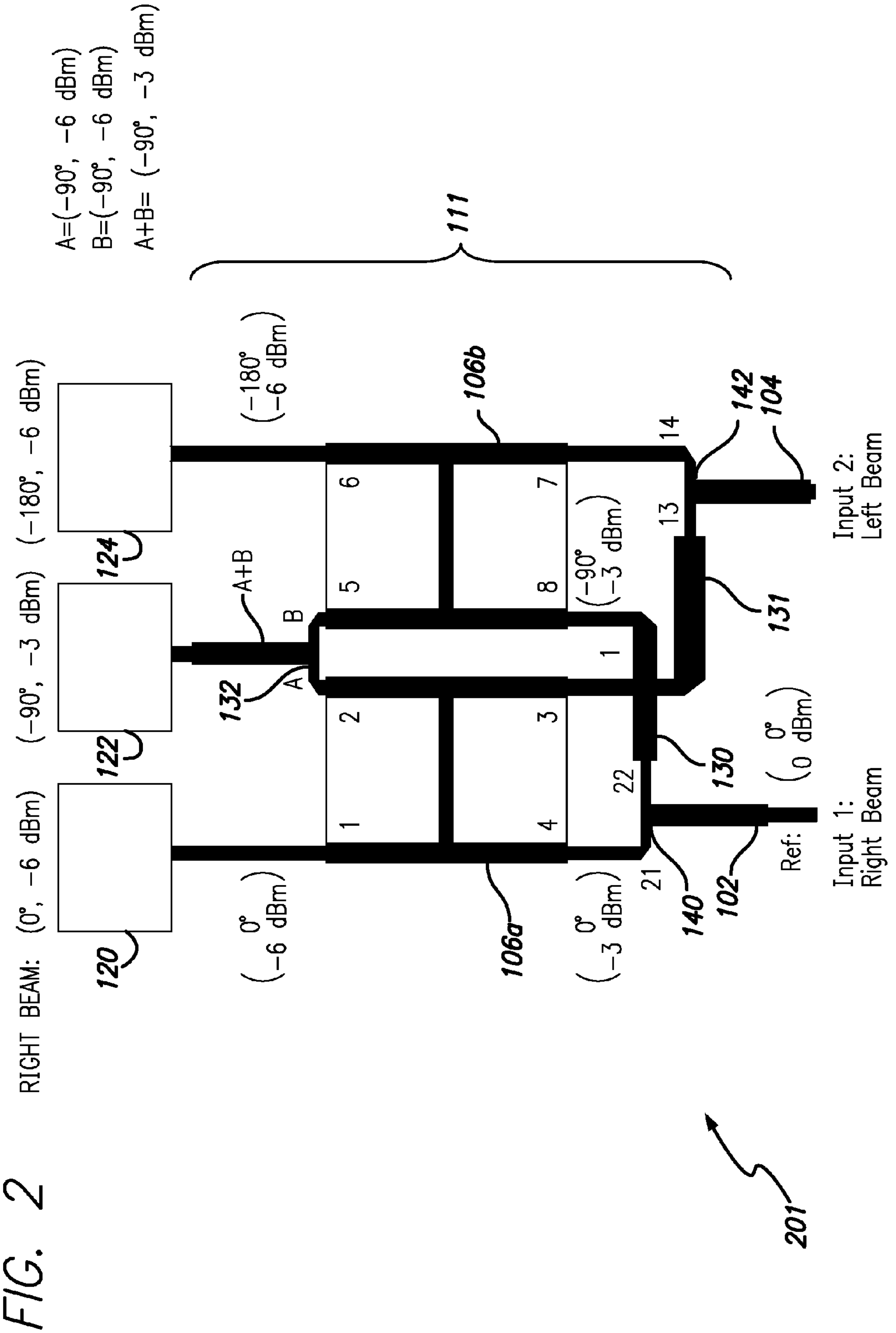
FIG. 2 is a schematic representation of a feed network employing two broadband 90 degree hybrid couplers in an embodiment.

The antenna can be single broadband, dual broadband, or multiband. Each band employs a 3 column array. The antenna employs a special 3 output feed network in order to provide the 0, 90, 180 degrees phase progression to achieve the patterns. This can be achieved by using a broadband 90 degree hybrid combined with a 180 degree splitter as illustrated in FIG. 1. An alternate approach combines outputs of 2 broadband 90 degree hybrids together as illustrated in FIG. 2. The problem with the first solution is that the phase variation is important over the band. Each band is about 25% of the bandwidth in some applications, and the phase may vary from about 72 to 110 degrees so the low sidelobes are not well maintained over the band. The second solution depicted in FIG. 2 allows the phase to stay within 90 degrees+/−5 degrees over a 25% bandwidth, therefore providing lower sidelobes. A 25% bandwidth is encountered when considering 698-894 MHz and 1710-2170 MHz implementations.

In order to maintain low sidelobe levels, it is also highly desirable to limit the spacing between the columns to about 0.5 of the wavelength. In the case of a multiband configuration, a combination of different antenna radiating elements (or radiators), specifically dipole radiators for low band and patch radiators for highband, can be used in order to fit the elements properly into the given space as illustrated in FIGS. 3A, 3B, 4, and 5. The vertical spacing cannot be increased to create more space otherwise creating lobes which would appear at heavy down tilt, diminishing antenna gain. If the mutual coupling within the same frequency band is too important because of proximity between elements, it is even possible to use different radiating elements such as a combination of dipole and patch for the same band as shown in FIG. 4. This combination of patch and dipole radiator elements provides a unique way to fit all the elements in the given space that is necessary to achieve the desired horizontal beamwidth.

Figure 3A:
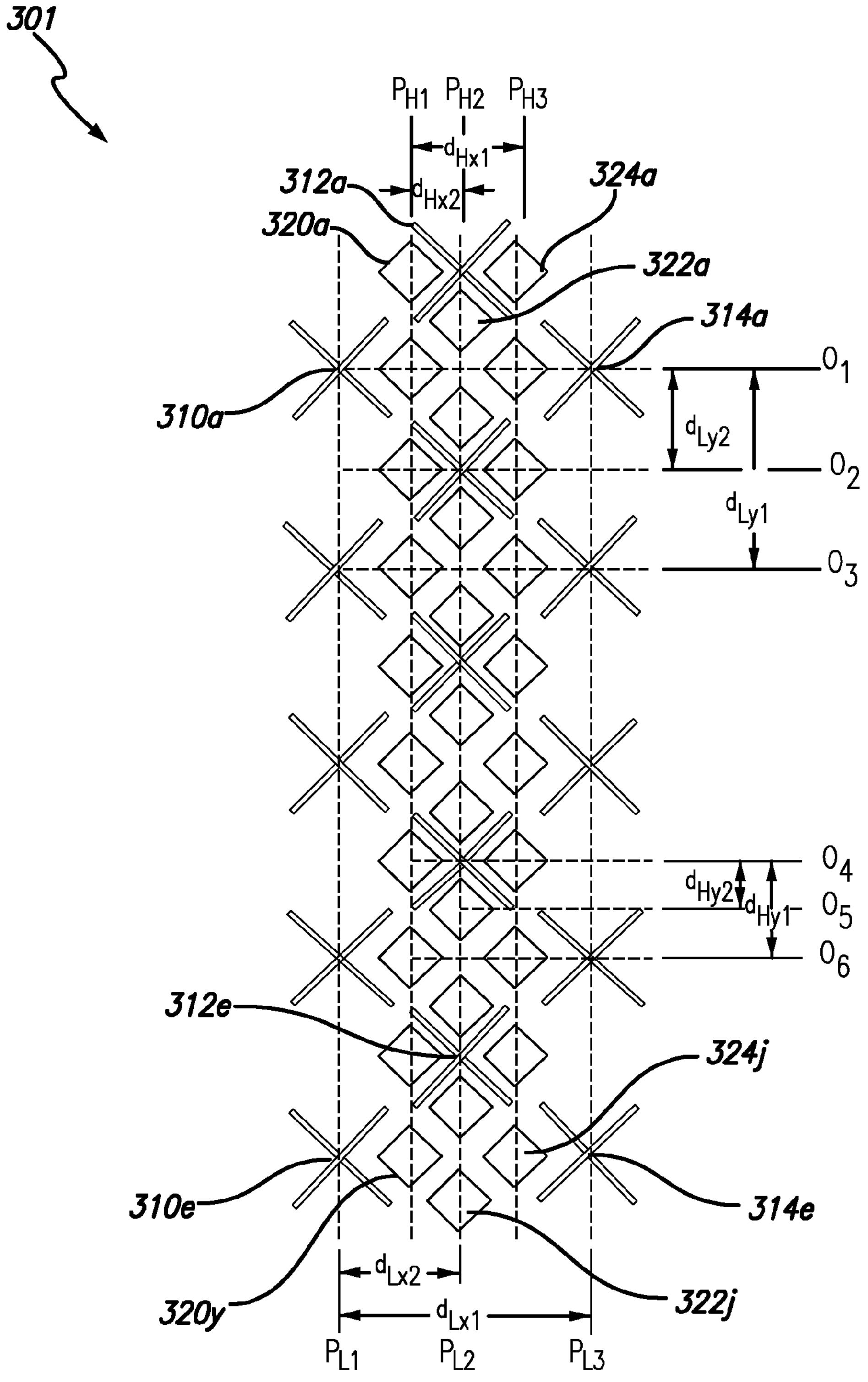
FIG. 3A is a front view of a dual band antenna array employing three columns of dipole elements and three columns of patch antenna elements in accordance with an embodiment.
Figure 3B:
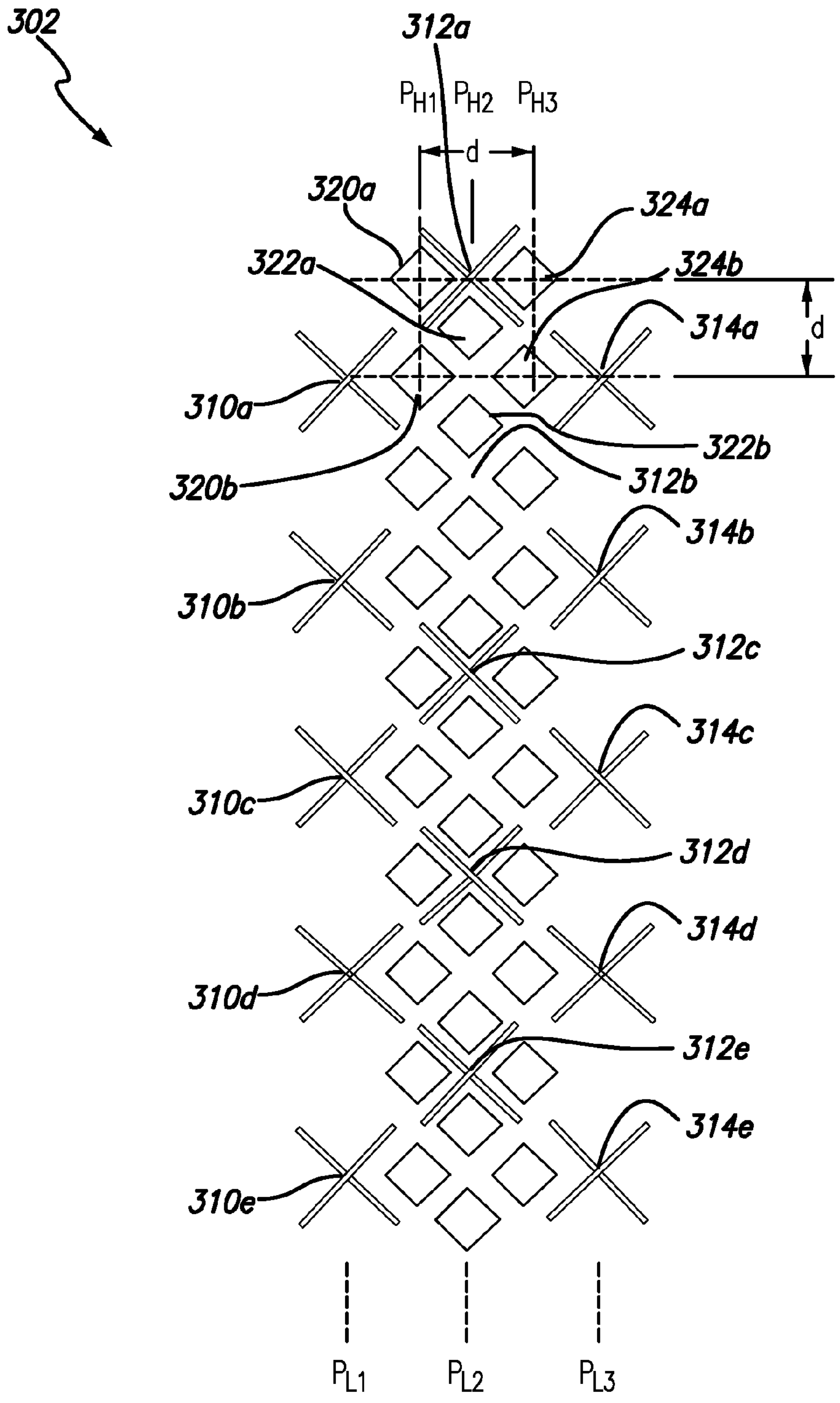
FIG. 3B is a front view of a dual band antenna having equally spaced vertical and horizontal elements in an embodiment.
Figure 4:
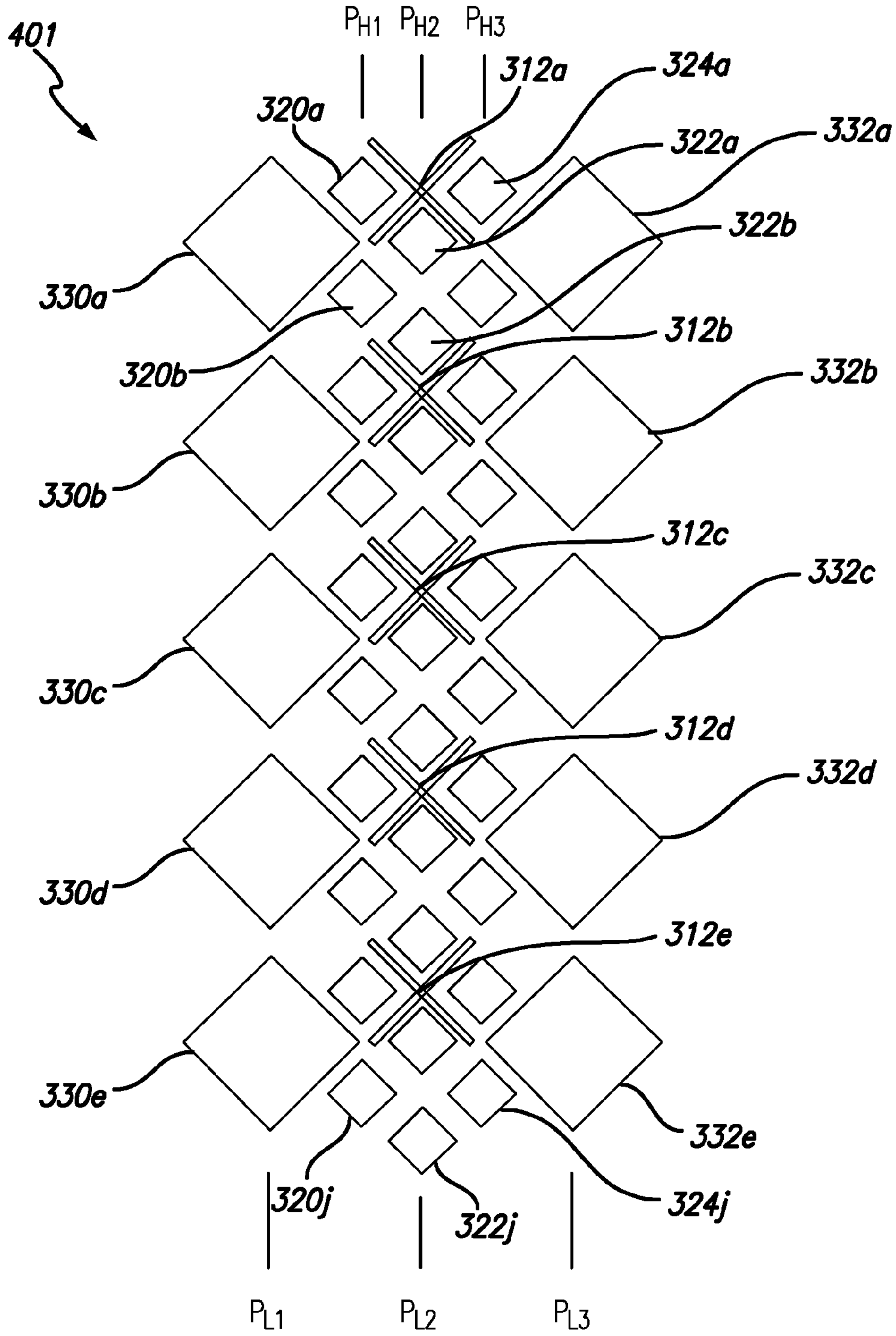
FIG. 4 is a front view of an antenna array employing a single column of dipole radiating elements in accordance with an embodiment.

FIGS. 3A and 3B show the use of patch radiators for highband and dipole radiators for lowband. The highband column spacing is slightly less than 0.5 of the wavelength in FIG. 3A. This uniform vertical and horizontal spacing can help improving isolation if necessary by having similar mutual coupling in both vertical and horizontal directions.

FIG. 4 shows another combination using maximum numbers of patch radiators and minimizing numbers of dipole radiators. This solution could be preferred if higher Xpolarization ratio performance is needed since patch radiators usually exhibit a better Xpolarization performance over the sector than traditional dipole radiators.

Figure 5:
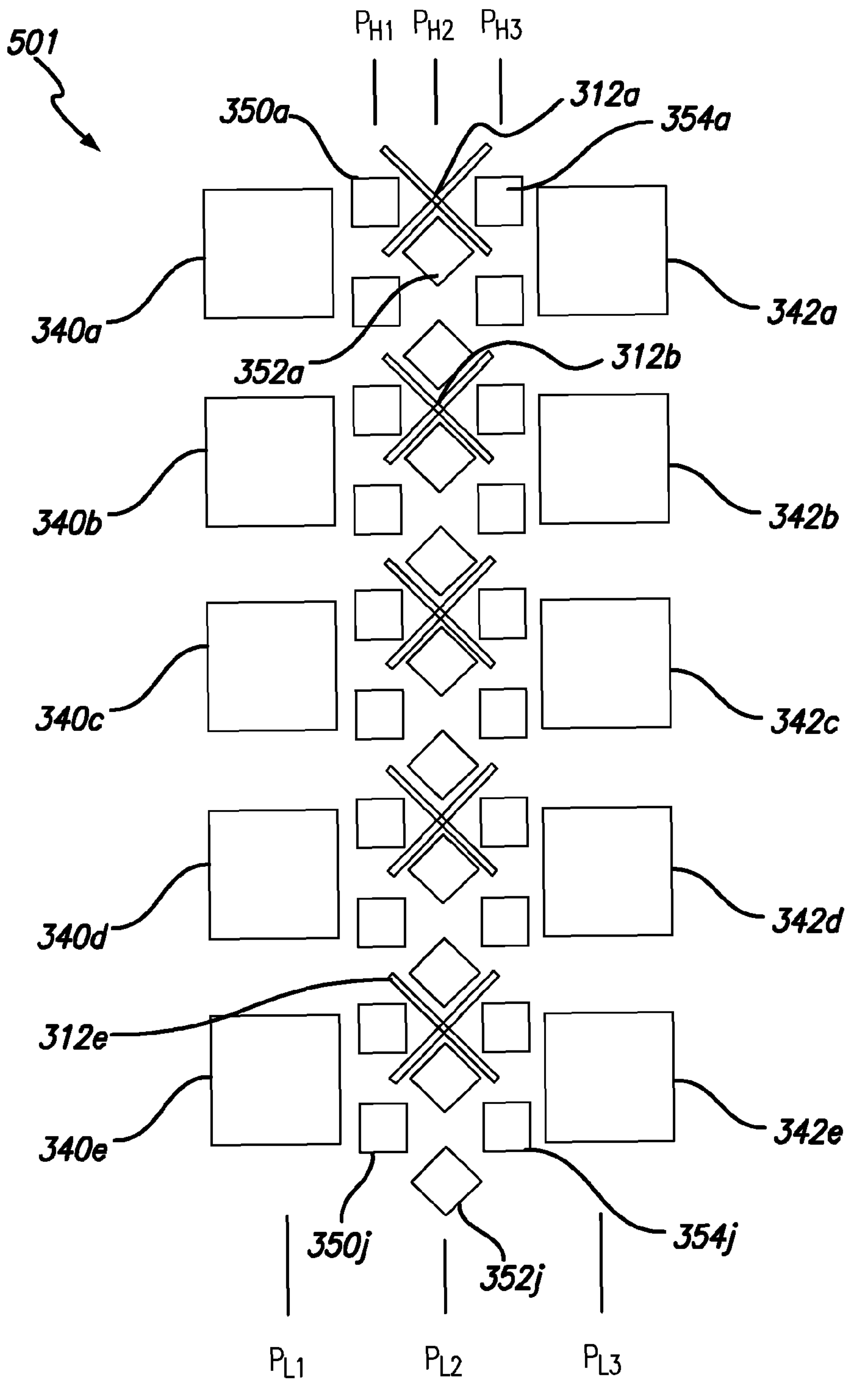
FIG. 5 is a front view of an antenna array employing differing orientation of the low band patch radiating elements in accordance with an embodiment.

FIG. 5 shows an alternate embodiment which has different orientation of elements that can provide lower mutual coupling between columns and therefore a more stable azimuth pattern.

Figure 6:
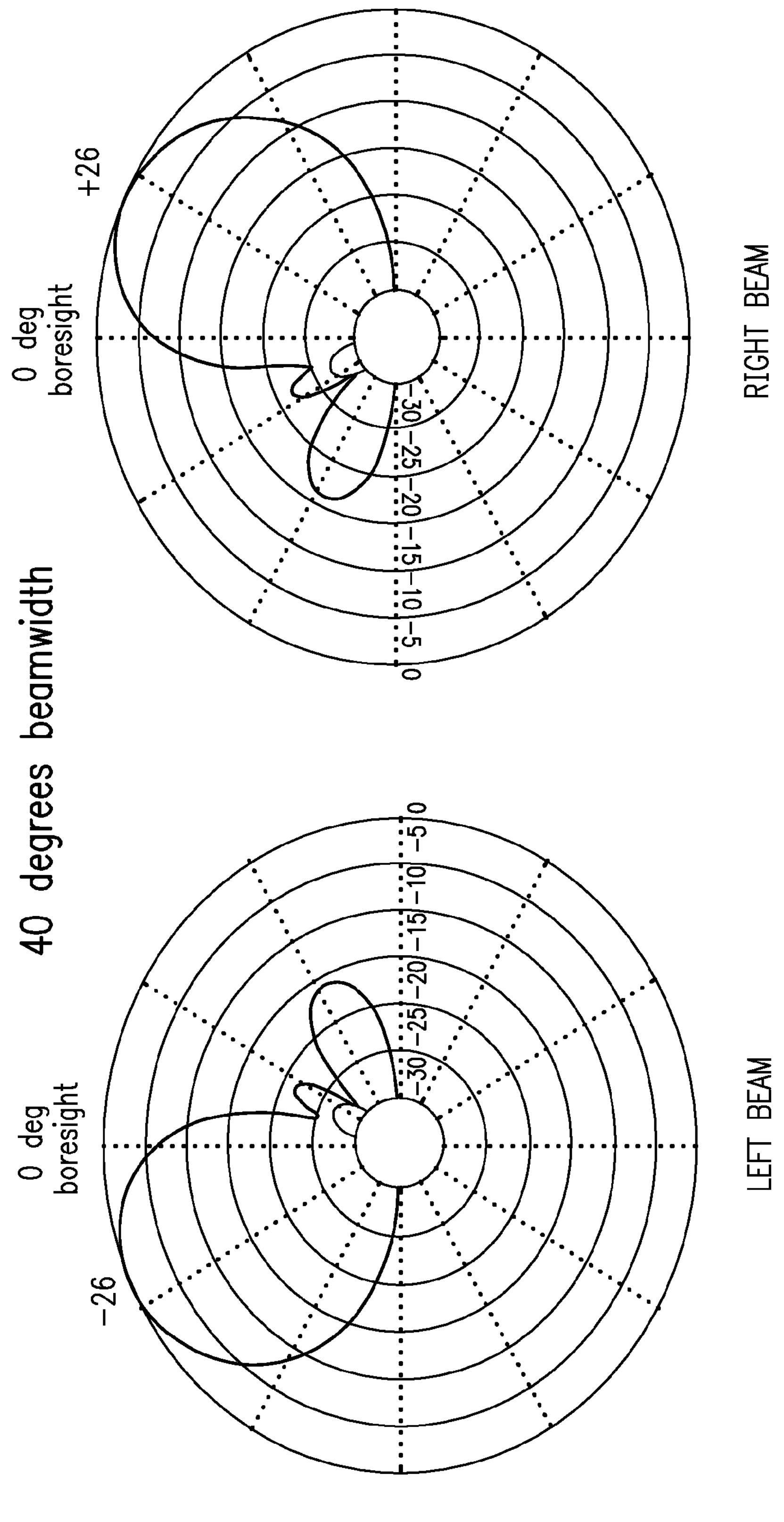
FIG. 6 depicts representations of simulated azimuth radiation patterns.

FIG. 6 shows the typical radiation patterns that will be obtained at center frequency of each band. The beamwidth will vary approximately from 35 to 41 degrees across 25% of the frequency bandwidth. The sidelobes will vary approximately from 25 to 16 dB across the band. The peak of each beam is at about −26 degrees and +26 degrees respectively.

Table I shows the approximate phase and amplitude progression that can be chosen to achieve optimum dual beam performance.

TABLE I

Approximate Phase and Amplitude Progression

| | Left Column | Mid Column | Right Column |
|---|---|---|---|
| Left Beam | | | |
| Amp(lin) | .58 | 1 | .58 |
| Phase(deg) | 0 | 90 | 180 |
| Right Beam | | | |
| Amp(lin) | .58 | 1 | .58 |
| Phase(deg) | 0 | −90 | −180 |

As discussed above, FIG. 1 illustrates an exemplary antenna system 101 in an embodiment having a plurality of antenna elements shown schematically as first set of antenna elements 120, a second set of antenna elements 122, and a third set of antenna elements 124. The second set of antenna elements 122 is positioned adjacent to the first set of antenna elements 120, and the third set of antenna elements 124 is positioned adjacent to the second set of antenna elements 122.

A beam forming feed network 110 has a first input 102 receiving a right beam RF signal and a second input 104 receiving a left beam RF signal. The beam forming feed network 110 also has a broadband 90 degree hybrid coupler 106 having a first port 1, a second port 2, a third port 3, and a fourth port 4. The first port 1 is coupled to the first input 102 and receives the right beam RF signal. The second port 2 is coupled to the second input 104 and receives the left beam RF signal. The fourth port 4 is connected to the second set of antenna elements 122 via line 114. A two-way splitter 108 is connected to the third port 3 of the hybrid coupler 106 and has a first splitter port 10 and a second splitter port 11. The second splitter port 11 is connected to the third set of antenna elements 124. The first splitter port 10 provides a 180 degree delayed signal 112 to the first set of antenna elements 120. Delay 112 and splitter 108 may be separate components or combined as part of the splitter and similarly for other delays shown schematically herein. In one or more embodiments, the phases of the emission of the first 120, second 122, and third sets 124 of antenna elements relative to the input provided by the feed network are illustrated in FIG. 1 for the right beam signal path, with the left beam path providing the desired opposite phase progression between elements.

FIG. 2 illustrates an exemplary antenna system 201 in an embodiment having a plurality of antenna elements shown schematically as first set of antenna elements 120, a second set of antenna elements 122, and a third set of antenna elements 124. The second set of antenna elements 122 is positioned adjacent to the first set of antenna elements 120, and the third set of antenna elements 124 is positioned adjacent to the second set of antenna elements 122.

A beam forming feed network 111 has a first input 102 receiving a right beam RF signal and a second input 104 receiving a left beam RF signal. The beam forming feed network 111 also has a first two-way splitter 140 connected to the first input 102 and splitting the right beam RF signal between a first splitter port 21 and a second splitter port 22. A first 90 degree delay 130 is connected to the second splitter port 22 and outputs a delayed right beam RF signal. The beam forming feed network 111 also has a second input 104 receiving a left beam RF signal. A second two-way splitter 142 is connected to the second input 104 and splits the left beam RF signal between a third splitter port 13 and fourth splitter port 14. A second 90 degree delay 131 is connected to the third splitter port 13 and outputs a delayed left beam RF signal.

The beam forming feed network 111 has a first broadband 90 degree hybrid coupler **106*a* and a second broadband 90 degree hybrid coupler 106*b*. The first broadband 90 degree hybrid coupler 106*a* has a first port 1, a second port 2, a third port 3, and a fourth port 4. The fourth port 4 is connected to the first two-way splitter 140 first splitter port 21. The third port 3 receives the 90 degree delayed left beam RF signal 131. The first port 1 is connected to the first set of antenna elements 120**.

The second broadband 90 degree hybrid coupler **106*b* has a fifth port 5, a sixth port 6, a seventh port 7, and an eighth port 8. The sixth port 6 is connected to the third set of antenna elements 124. The seventh port 7 is connected to the fourth splitter port 14 of the second two-way splitter 142. The eighth port 8 receives the 90 degree delayed right beam RF signal 130. The beam forming feed network 111 also has a two-way combiner 132 connected to and combining the second port 2 of the first hybrid coupler 106*a* and the fifth port 5 of the second hybrid coupler 106*b* and provides an output RF signal to the second set of antenna elements 122**.

In one or more embodiments, the low side lobes level and sharper roll off to minimize sector to sector interference requires a much tighter control of phase over the band which is achieved with the broadband 90 degree hybrid.

FIG. 3A shows an embodiment of an antenna array 301 having a first set of antenna elements **310*a*-310*j*, a second set of antenna elements 312*a*-312*j*, and a third set of antenna elements 314*a*-314*j* being arranged as a first, second, and third column and aligned along a first symmetry axis $P_{L1}$, a second symmetry axis $P_{L2}$, and a third symmetry axis $P_{L3}$, respectively. The first, second, and third axes $P_{L1}$, $P_{L2}$, and $P_{L3}$ are parallel with each other. The first and second axes $P_{L1}$ and $P_{L2}$ are separated by a distance $d_{LX2}$ and the first and third axes $P_{L1}$ and $P_{L3}$ are separated by a distance $d_{LX1}$. In one or more embodiments the radiation emission patterns may be tailored by altering $d_{LX2}$ and $d_{LX1}$-$d_{LX2}$. The first and third set of antenna elements 310*a*-310*j* and 314*a*-314*j* are aligned with respect to axes $O_1$, and $O_3$ orthogonal to the first and third symmetry axes $P_{L1}$ and $P_{L3}$. The second set of antenna elements 312*a*-312*j* are offset with respect to the axes $O_1$, and $O_3$ and are aligned with respect to axes $O_2$ orthogonal to the first and third symmetry axes $P_{L1}$ and $P_{L3}$. The $O_1$ and $O_2$ axes are separated by a distance $d_{LY2}$ and the $O_1$ and $O_3$ axes $P_{L1}$ and $P_{L3}$ are separated by a distance $d_{LY1}$. In one or more embodiments the radiation emission patterns may be tailored by altering $d_{LY2}$ and $d_{LY1}$-$d_{LY2}$. The first, second, and third sets of antenna elements 310*a*-310*j*, 312*a*-312*j*, and 314*a*-314*j*** are operative in a first frequency band.

The antenna array 301 also has a fourth set of antenna elements 320*a*-320*j*, a fifth set of antenna elements 322*a*-322*j*, and a sixth set of antenna elements 324*a*-324*j* being arranged as a fourth, fifth, and sixth column and aligned along a fourth symmetry axis $P_{H1}$, a fifth symmetry axis $P_{H2}$, and a sixth symmetry axis $P_{H3}$, respectively. The fourth, fifth, and sixth axes $P_{H1}$, $P_{H2}$, $P_{H3}$ are parallel with each other and the first, second, and third symmetry axes $P_{L1}$, $P_{L2}$, and $P_{L3}$. The fifth symmetry axis $P_{H2}$ is co-located with the second symmetry axis $P_{L2}$ and the fourth and sixth symmetry axes $P_{H1}$ and $P_{H3}$ is located between the first and third symmetry axes $P_{L1}$ and $P_{L3}$. The fourth and fifth axes $P_{H1}$ and $P_{H2}$ are separated by a distance $d_{HX2}$ and the first and third axes $P_{L1}$ and $P_{L3}$ are separated by a distance $d_{HX1}$. In one or more embodiments, the radiation emission may be tailored by altering the distances $d_{HX2}$ and $d_{HX1}$. In one or more embodiments the distances $d_{HX2}$ and $d_{HX1}$-$d_{HX2}$ may be slightly less than 0.5 of the emission wavelength.

The fourth and sixth set of antenna elements 320*a*-320*j* and 324*a*-324*j* are aligned with respect to axes $O_4$ and $O_6$ orthogonal to the fourth and sixth symmetry axes $P_{H1}$ and $P_{H3}$. The fifth set of antenna elements 322*a*-322*j* are offset with respect to the axes $O_4$ and $O_6$ and are positioned on axis $O_5$. The $O_4$ and $O_6$ axes are separated by a distance $d_{HX2}$ and the $O_4$ and $O_6$ axes are separated by a distance $d_{HX1}$. In one or more embodiments the radiation emission patterns may be tailored by altering $d_{HX2}$ and $d_{HX1}$.-$d_{HX2}$.

The fourth, fifth, and sixth antenna elements 320*a*-320*j*, 322*a*-322*j*, and 324*a*-324*j* operate in a second frequency band. As discussed above with respect to FIGS. 1 and 2, a first beam forming feed network is coupled to the first, second, and third set of antenna elements 310*a*-310*j*, 312*a*-312*j*, and 314*a*-314*j*, and a second beam forming feed network coupled to the fourth, fifth, and sixth set of antenna elements 320*a*-320*j*, 322*a*-322*j*, and 324*a*-324*j*. 9. In one or more embodiments, the frequency of the first frequency band is less than the frequency of the second frequency band.

Referring to FIGS. 3A and 3B, in one or more embodiments, the first, second, and third set of antenna elements 310*a*-310*j*, 312*a*-312*j*, and 314*a*-314*j* comprise dipole antenna elements, each having elements oriented at approximately a 45 degree angle with respect to the first, second, and third symmetry axes $P_{L1}$, $P_{L2}$, and $P_{L3}$. The fourth, fifth, and sixth set of antenna elements 320*a*-320*j*, 322*a*-322*j*, and 324*a*-324*j* comprise patch antennas, each having sides oriented at approximately a 45 degree angle with respect to the fourth, fifth, and sixth symmetry axes $P_{H1}$, $P_{H2}$, $P_{H3}$.

Referring to FIG. 3A, as a result of this antenna array architecture, the lowband polarized dipoles 312*a*-312*j* can fit between the highband dual polarizing patches 320*a*-320*j* and 322*a*-322*j* while maintaining a 0.4λ-0.55λ (radiation emission wavelength λ) column spacing for each band. Referring to FIG. 3B, equal vertical and horizontal spacing ("d") between the patches such as antenna elements 322*a*, 324*a*, 324*b*, and 322*b* provide isolation performance between the polarizations +45 degrees and −45 degrees. As depicted in FIGS. 3A and 3B, the use of dipoles for LB and patch for HB will increase RF decoupling between band therefore will increase pattern control and antenna efficiency in one or more embodiments.

FIGS. 4 and 5 illustrate the possibility of using different elements between columns of the same LB array. This can improve mutual coupling between columns and therefore can improve pattern control as well, and also port to port isolation.

FIG. 4 shows an embodiment of an antenna array 401 having similar layout with the first set of antenna elements 330*a*-330*e* and third set of antenna elements 332*a*-332*e* comprise a first set of patch antennas, each having sides oriented at approximately a 45 degree angle with respect to the first and third symmetry axes $P_{H1}$ and $P_{H3}$. The second set of antenna elements 312*a*-312*e* comprise dipole antennas. The fourth, fifth, and sixth set of antenna elements 320*a*-320*j*, 322*a*-322*j*, and 324*a*-324*j* comprise a second set of patch antennas, each having sides oriented at approximately a 45 degree angle with respect to the fourth, fifth, and sixth symmetry axes. One or more embodiments combine patches for the high band and hybrid solutions for lowband using dipoles in the middle columns and patches in the outer columns.

FIG. 5 illustrates high band patches with different orientation to fit in the physical space and maintain correct element spacing. FIG. 5 depicts an embodiment of an antenna array 501 having a similar layout where the first set of antenna elements 340*a*-340*e* and the third set of antenna elements 342*a*-342*e* comprise a first set of patch antennas, each having sides oriented parallel with respect to the first and third symmetry axes $P_{L1}$ and $P_{L3}$. The second set of antenna elements 312*a*-312*e* comprise dipole antenna elements, each having elements oriented at approximately a 45 degree angle with respect to the second symmetry axis $P_{L2}$. The fourth set of antenna elements 350*a*-350*j* and sixth set of antenna elements 354*a*-354*j* comprise a second set of patch antennas, each having sides oriented parallel with respect to the fifth symmetry axis $P_{H2}$. The fifth set of antenna elements 352*a*-352*j* comprise a third set of patch antennas, each having sides oriented at approximately a 45 degree angle with respect to the fourth and sixth symmetry axes $P_{H1}$ and $P_{H2}$.

The present invention has been described primarily as methods and structures for providing a multiband split beam antenna for a wireless network. The description is not intended to limit the invention to the form disclosed herein. Accordingly, variants and modifications consistent with the following teachings, skill, and knowledge of the relevant art, are within the scope of the present invention. The embodiments described herein are further intended to explain modes known for practicing the invention disclosed herewith and to enable others skilled in the art to utilize the invention in equivalent, or alternative embodiments and with various modifications considered necessary by the particular application(s) or use(s) of the present invention.

What is claimed is:

1. An antenna system comprising:

a first set of one or more antenna elements, a second set of one or more antenna elements, and a third set of one or more antenna elements, the second set of antenna elements positioned adjacent to the first set of antenna elements, the third set of antenna elements positioned adjacent to the second set of antenna elements; and a beam forming feed network comprising:

a first input receiving a right beam RF signal;

a second input receiving a left beam RF signal;

a broadband 90 degree hybrid coupler having a first, a second, a third, and a fourth port, the first port coupled to the first input and receiving the right beam RF signal, the second port coupled to the second input and receiving the left beam RF signal, the fourth port connected to the second set of antenna elements;

a two-way splitter connected to the hybrid coupler third port, the splitter having a first and a second splitter port, the second splitter port connected to the third set of antenna elements, and the first splitter port providing a 180 degree delayed signal to the first set of antenna elements.

2. An antenna system as set out in claim 1, wherein the first, second, and third sets of antenna elements generates a dual beam RF radiated emission pattern having a left beam and a right beam.

3. An antenna system as set out in claim 1, wherein the antenna system provides a dual frequency band signal.

4. An antenna system comprising:

a first set of one or more antenna elements, a second set of one or more antenna elements, and a third set of one or more antenna elements, the second set of antenna elements positioned adjacent to the first set of antenna elements, the third set of antenna elements positioned adjacent to the second set of antenna elements; and a beam forming feed network comprising:

a first input receiving a right beam RF signal;

a first two-way splitter connected to the first input and splitting the right beam RF signal between a first and second splitter port;

a second input receiving a left beam RF signal;

a second two-way splitter connected to the second input and splitting the left beam RF signal between a third and fourth splitter port;

a first broadband 90 degree hybrid coupler having a first, a second, a third, and a fourth port, the fourth port connected to the first two-way splitter first splitter port, the third port receiving a 90 degree delayed left beam RF signal, the first port connected to the first set of antenna elements;

a second broadband 90 degree hybrid coupler having a fifth, a sixth, a seventh, and an eighth port, the sixth port connect to the third set of antenna elements, the seventh port connected to the fourth splitter port of the second two-way splitter, the eighth port receiving a 90 degree delayed right beam RF signal; and a two-way combiner connected to and combining the second port of the first hybrid coupler and the fifth port of the second hybrid coupler and providing an output RF signal to the second set of antenna elements.

5. An antenna system as set out in claim 4, wherein the first, second, and third sets of antenna elements generates a dual beam RF radiated emission pattern having a left beam and a right beam.

6. An antenna system as set out in claim 5, wherein relative phases of the emission of the first, second, and third sets of antenna elements are 0 degrees, + or −90 degrees, and + or −180 degrees, respectively, for the left and right beam signals.

7. An antenna system as set out in claim 4, wherein the antenna system provides a dual frequency band signal.

8. An antenna system comprising:

a first, second, and third set of antenna elements being arranged as a first, second, and third column and aligned along a first, second, and third symmetry axis, respectively, the first, second, and third axes being parallel with each other, wherein the first and third set of antenna elements are also aligned with respect to axes orthogonal to the first and third symmetry axes, and wherein the second set of antenna elements are offset with respect to the axes orthogonal to the first and third symmetry axes, the first, second, and third antenna elements being operative in a first frequency band; and, a fourth, fifth, and sixth set of antenna elements being arranged as a fourth, fifth, and sixth column and aligned along a fourth, fifth, and sixth symmetry axes, respectively, the fourth, fifth, and sixth axes being parallel with each other and the first, second, and third symmetry lines, the fifth symmetry axis being co-located with the second symmetry axis and the fourth and sixth symmetry axes located between the first and third symmetry axes, wherein the fourth and sixth set of antenna elements are also aligned with respect to axes orthogonal to the fourth and sixth symmetry axes, and the fifth set of antenna elements are offset with respect to the axes orthogonal to the fourth and sixth symmetry axes, the fourth, fifth, and sixth antenna elements being operative in a second frequency band.

9. An antenna system as set out in claim 8, further comprising a dual beam forming network coupled to each of the respective antenna elements.

10. An antenna system as set out in claim 8, wherein the frequency of the first frequency band is less than the frequency of the second frequency band.

11. An antenna system as set out in claim 8, wherein:

the first, second, and third set of antenna elements comprise dipole antenna elements, each having elements oriented at approximately a 45 degree angle with respect to the first, second, and third symmetry axes; and, the fourth, fifth, and sixth set of antenna elements comprise patch antennas, each having sides oriented at approximately a 45 degree angle with respect to the fourth, fifth, and sixth symmetry axes.

12. An antenna system as set out in claim 8, wherein:

the first and third set of antenna elements comprise a first set of patch antennas, each having sides oriented at approximately a 45 degree angle with respect to the first and third symmetry axes;

the second set of antenna elements comprise dipole antennas; and, the fourth, fifth, and sixth set of antenna elements comprise a second set of patch antennas, each having sides oriented at approximately a 45 degree angle with respect to the fourth, fifth, and sixth symmetry axes.

13. An antenna system as set out in claim 8, wherein:

the first and third set of antenna elements comprise a first set of patch antennas, each having sides oriented parallel with respect to the first and third symmetry axes;

the second set of antenna elements comprise dipole antenna elements, each having elements oriented at approximately a 45 degree angle with respect to the second symmetry axis;

the fourth and sixth set of antenna elements comprise a second set of patch antennas, each having sides oriented at approximately a 45 degree angle with respect to the fourth and sixth symmetry axes; and, the fifth set of antenna elements comprise a third set of patch antennas, each having sides oriented parallel with respect to the fifth symmetry axis.

14. An antenna system as set out in claim 10, wherein the separation between adjacent symmetry axes of the fourth, fifth, and sixth symmetry axes is the product of the wavelength of second frequency band and a value in the range of 0.4 and 0.55.

15. An antenna system as set out in claim 8, wherein the separation of the antenna elements in the fourth, fifth, and sixth set of antenna elements is uniformly spaced with respect to the fifth symmetry axis and the axis orthogonal to the fifth symmetry axis.

* * * * *